US007117798B2

(12) United States Patent
Lehrieder

(10) Patent No.: US 7,117,798 B2
(45) Date of Patent: Oct. 10, 2006

(54) GOODS TRANSPORT SYSTEM AND METHOD FOR OPERATING A GOODS TRANSPORT SYSTEM

(75) Inventor: Erwin Paul Josef Lehrieder, Gaukönigshofen (DE)

(73) Assignee: Koenig & Bauer Aktiengesellschaft, Wurzburg (DE)

( * ) Notice: Subject to any disclaimer, the term of this patent is extended or adjusted under 35 U.S.C. 154(b) by 0 days.

(21) Appl. No.: 10/507,693

(22) PCT Filed: Dec. 24, 2002

(86) PCT No.: PCT/DE02/04748

§ 371 (c)(1),
(2), (4) Date: Sep. 23, 2004

(87) PCT Pub. No.: WO03/080484

PCT Pub. Date: Oct. 2, 2003

(65) Prior Publication Data

US 2005/0166784 A1    Aug. 4, 2005

(30) Foreign Application Priority Data

Mar. 26, 2002  (DE)  ................. 102 13 459

(51) Int. Cl.
 *B61J 3/00*    (2006.01)
 *B61K 1/00*    (2006.01)
(52) U.S. Cl. ............................................. 104/88.04
(58) Field of Classification Search ............ 104/88.01, 104/88.02, 88.03, 88.04, 106, 107, 108; 701/19
See application file for complete search history.

(56) References Cited

U.S. PATENT DOCUMENTS

| 3,277,283 | A  |   | 10/1966 | Rabinow et al. |
| 4,609,922 | A  |   | 9/1986  | Boegli et al. |
| 5,117,096 | A  |   | 5/1992  | Bauer et al. |
| 6,155,516 | A  | * | 12/2000 | Lehrieder et al. ........ 242/559.3 |
| 6,293,384 | B1 |   | 9/2001  | Gartner |
| 6,334,587 | B1 |   | 1/2002  | Roder |
| 6,535,777 | B1 | * | 3/2003  | Kohler ....................... 700/112 |

FOREIGN PATENT DOCUMENTS

| AT | 393 257 B     | 9/1991  |
| DE | 39 42 009 C2  | 12/1989 |
| DE | 44 46 203 A1  | 12/1994 |
| DE | 195 32 281    | 6/1997  |
| DE | 198 42 752    | 6/2000  |
| EP | 0 633 207 A1  | 6/1994  |
| EP | 1 106 542 A1  | 6/2001  |
| WO | WO 98/12131   | 3/1998  |
| WO | WO 98/28213   | 7/1998  |

\* cited by examiner

*Primary Examiner*—S. Joseph Morano
*Assistant Examiner*—Robert J. McCarry, Jr.
(74) *Attorney, Agent, or Firm*—Jones, Tullar & Cooper, P.C.

(57) ABSTRACT

A good transport system includes a network of rails and a plurality of trolleys that travel on the rails. Read/write assembles are disposed on the rails and are used to read data from, and to write data on data carriers which are mounted on the trolleys. When a trolley is loaded, data regarding the goods loaded on the trolley is written onto the data carrier. That data is deleted when the goods are unloaded from the trolley.

21 Claims, 3 Drawing Sheets

GOODS TRANSPORT SYSTEM AND METHOD FOR OPERATING A GOODS TRANSPORT SYSTEM

CROSS-REFERENCE TO RELATED APPLICATIONS

This application is the U.S. National Phase, under 35 U.S.C. 371, of PCT/DE02/04748, filed Dec. 24, 2002; published as WO 03/080484 A1 on Oct. 2, 2003 and claiming priority to DE 102 13 459.6 filed Mar. 26, 2002, the disclosures of which are expressly incorporated herein by reference.

FIELD OF THE INVENTION

The present invention is directed to a transport system for articles and to a method for operating a transport system for articles. The transport system includes a network of tracks and a number of transport carts which can be moved on the tracks.

BACKGROUND OF THE INVENTION

A transport system for articles is known from WO 98/12313. Transport carts are used for transporting and for the intermediate storage of paper rolls which are intended for use in a printing press. The tracks of this transport system are arranged below the level of the surrounding ground, and the transport carts each have a support plate slightly projecting above the ground level for receiving the paper rolls.

Paper webs of varying properties, such as grain, surface quality, and the like can be used at the same time in a web-fed rotary printing press. They must be brought to the correct roll changer at the correct time. To simplify this process, it is proposed, in WO 98/28213, to equip paper rolls, which are transported in a transport system, with a contactless read/write data support, which can be written on and from which data can be read out by read/write devices installed at defined locations on the tracks. Information regarding important properties of a paper roll can be written on each of these data supports, so that it is possible, by reading out this property with the aid of a read/write device installed at a suitable location, to gain information regarding the properties of the roll present at the location of the read/write device in order to pass this roll, in accordance with its properties, along to a roll changer intended to receive it.

With these previously known transport systems, each roll of material, which is within the range of the transport system, must be equipped with such a read/write data support in order to be automatically correctly transported.

If the data supports are not recovered after a roll of material has been used, the cost of each roll of material is increased by the cost of the data support. However, the recovery of the data supports entails outlay for labor and organization. If the data supports are installed by the manufacturer of the rolls of materials, it is necessary that the user of these rolls of material conveys the data supports from used-up rolls of material back to the manufacturer. If the user of the rolls of material obtains these rolls of material from various different manufacturers, the compatibility of the data support from all of the various different manufacturers must be assured. If the user himself equips the rolls of material with data supports, he is forced to determine the data of each roll of material which is brought within the range of the transport system because of the roll being placed into a storage facility or in other ways, and to enter that data in the data support attached to the roll of material.

Since it is necessary to provide every roll of material within the range of the transport system, in other words possibly the entire stock, with a data support, a large number of data supports are required for implementing the system.

DE 39 42 009 C2 describes a system for the control and monitoring of the distribution of freight. Containers are each provided with a data carrier which can be repeatedly written on.

DE 44 46 203 A1 discloses a method for the digital recording of the circulation of beer barrels.

SUMMARY OF THE INVENTION

The object of the present invention is directed to providing a transport system for articles and to providing a method for operating a transport system for articles.

In accordance with the present invention, the object is attained by the provision of a transport system for articles that includes a network of tracks and a number of transport carts which can be moved on the tracks. Data supports are arranged on the transport carts and read/write devices are arranged along the tracks. The transport cart tracks are typically below floor level while the transport carts have article supports that extend above floor level. The carts each have at least one data support below floor level. When the cart has been unloaded, the data on the data support is erased or is altered.

In accordance with the transport system for articles of the present invention, at least one data carrier, which data carrier may be, in particular, a transponder, is mounted on each transport cart, and can record the data of a roll of material being conveyed on the transport cart. It is thus no longer necessary to supply each article to be transported individually with data supports and to remove those data supports from the article after the article has been used up. The number of transport carts employed in such a transport system is generally less than the number of articles to be transported, which number of articles could be simultaneously within the range of the transport system. The number of required data carriers is thus simultaneously reduced, so that the cost of implementing such a system is less than if data carriers were mounted on each of the articles to be transported. Because the data carriers do not leave the system and are therefore provided, in the system, with the relevant data of the articles to be transported, compatibility problems are also avoided. Such problems could otherwise arise in connection with the conventional system when articles are transported which had been provided with different data supports, each provided by the article's manufacturer.

In a transport system, in accordance with the present invention, with tracks enclosed by a housing, the data supports are mounted on a portion of the undercarriage within the housing of each vehicle. They are well protected against soiling or damage, and a high degree of dependability is achieved. With such a system, the read/write devices are also preferably arranged in the housing.

The goods transport system, in accordance with the present invention, is preferably structured as an underfloor transport system, so that it is a transport system in which the housing for the tracks is located below the level of the surrounding ground. In this system, the data supports, as well as the associated read/write devices, are also arranged below the floor, so that they are also below the level of the surrounding ground.

In a preferred embodiment of the present invention, the tracks of the transport system have a cross-section which is mirror-reversed, in relation to a horizontal plane, and which has two legs, wherein a lower leg supports the wheels of the transport cart, and an upper leg extends at a short distance above the wheels. With such a system the read/write devices are preferably arranged at a level which is half the height of the tracks. This simplifies the mounting of the tracks. The installation height of a read/write device is always the same, regardless of which of the two legs of the rail of the system is mounted at the bottom and which one is mounted on top.

The data carriers, which are mounted on the transport carts, are preferably mounted at the height of the axles, so that they lie substantially at the same level as the read/write devices and can move past them, spaced from these read/write devices at a short distance. In particular, in case the data supports are mounted on the transport cart on a wheel hub of the transport cart, it is possible to achieve a very short distance between the read/write device and the data carrier when a transport cart passes the read/write device.

Since empty transport carts in the system are also each equipped with a data carrier, the position of such carts within the framework of the system can be easily detected. For this purpose, it is furthermore advantageous if identification information is stored in each data carrier, which information unequivocally identifies the particular transport cart on which the data carrier is mounted.

Because of the large reading range, an almost complete tracking of the transport carts in the rail system is possible.

In case of a loss of electrical current supply, a retention of the complete amount of data of the transport cart is possible.

In the course of the operation of the transport system for articles in accordance with the present invention, data pertaining to an article is written into the data carrier of the transport cart each time the transport cart is loaded with an article. This data is then erased when the article is unloaded.

In a transport system for articles, which system is comprised of a plurality of loading stations for loading articles on transport carts, it is useful to make articles having the same properties available at each one of these loading stations. In that case, the data to be entered into the data carrier, in the course of loading a transport cart at this loading station, can always be the same. This means that, for an operator of the transport system for articles, it suffices to make the articles to be transported available, sorted in accordance with their properties, at the various loading stations of the system. The correct recording of the values of the properties of the articles on the data supports can then be performed automatically by the system, without the recording of the properties of each individual article being required.

If articles are transferred from one transport cart to another within the system, these articles will be preferably transferred at the transfer point where the data regarding the article are transferred from the data carrier of the transport cart being unloaded to that of the cart being loaded.

BRIEF DESCRIPTION OF THE DRAWINGS

Preferred embodiments of the present invention are represented in the drawings and will be described in greater detail in what follows.

Shown are in.

DESCRIPTION OF THE PREFERRED EMBODIMENTS

Figure 1:
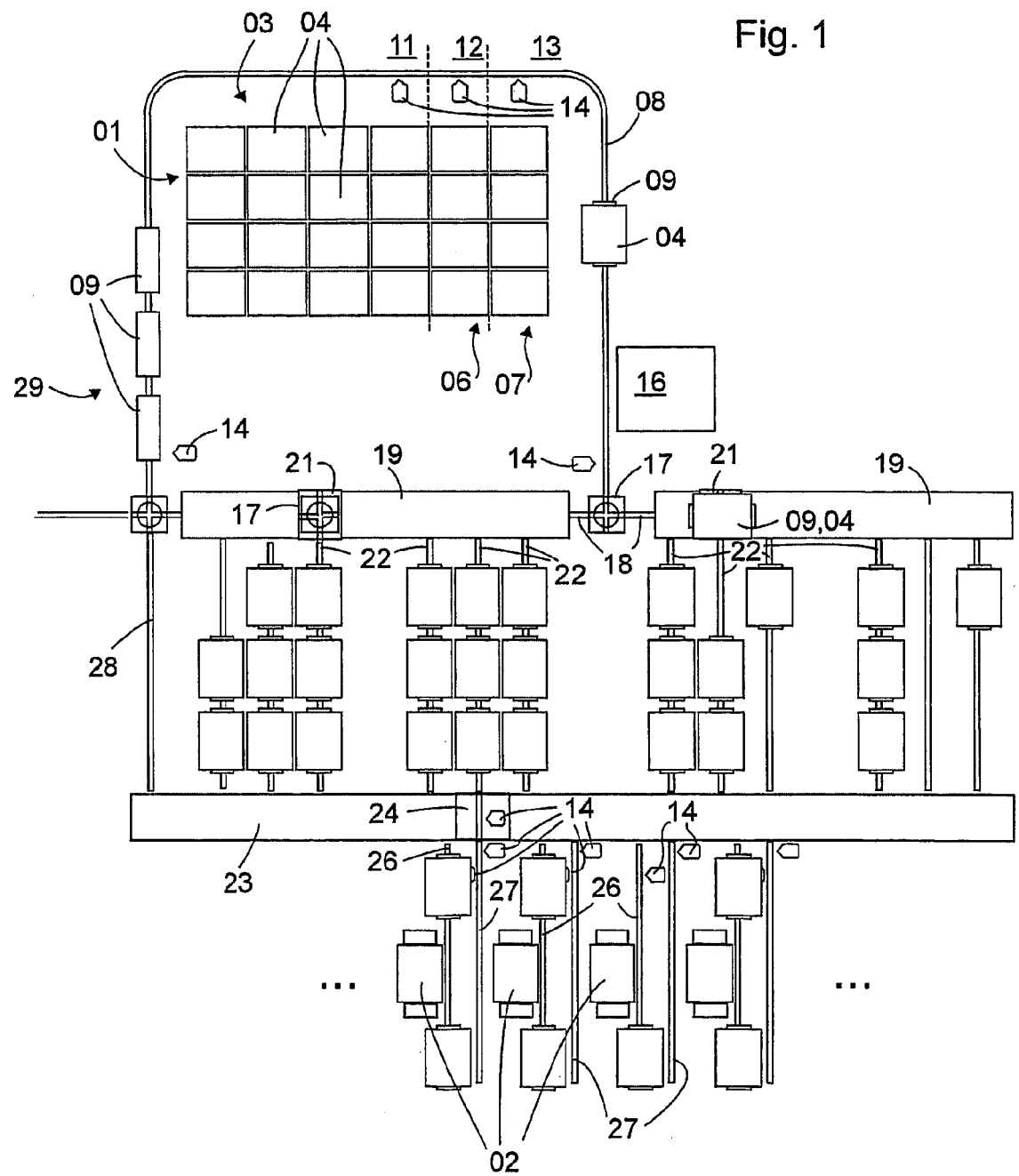
FIG. 1, a schematic top plan view of a first preferred embodiment of a transport system for articles in accordance with the present invention, in FIG. 2, a cross-sectional view through a track and through a transport cart of the transport system for articles, and in FIG. 3, a top plan view of a portion of a second preferred embodiment of a transport system for articles, which is modified from the first embodiment shown in FIG. 1.

A schematic top plan view of a transport system for transporting rolls 04 of material, for example paper rolls 04, from a storage facility 01 to the roll changers 02 of a web-fed rotary printing press, in accordance with the present invention, is represented in FIG. 1.

The storage facility 01 is divided into a plurality of areas or zones, which zones, as shown in FIG. 1, are delimited by dashed lines and which zones are respectively provided for receiving articles 04, in particular paper rolls 04, of varying properties. For example, a comparatively large area or zone 03 for rolls 04 of material of a quality from which the inside of a magazine is to be produced is provided. In addition, smaller areas or zones 06, 07 for rolls 04 of material with different paper qualities, for example for producing the cover of a magazine are also provided.

Figure 2:
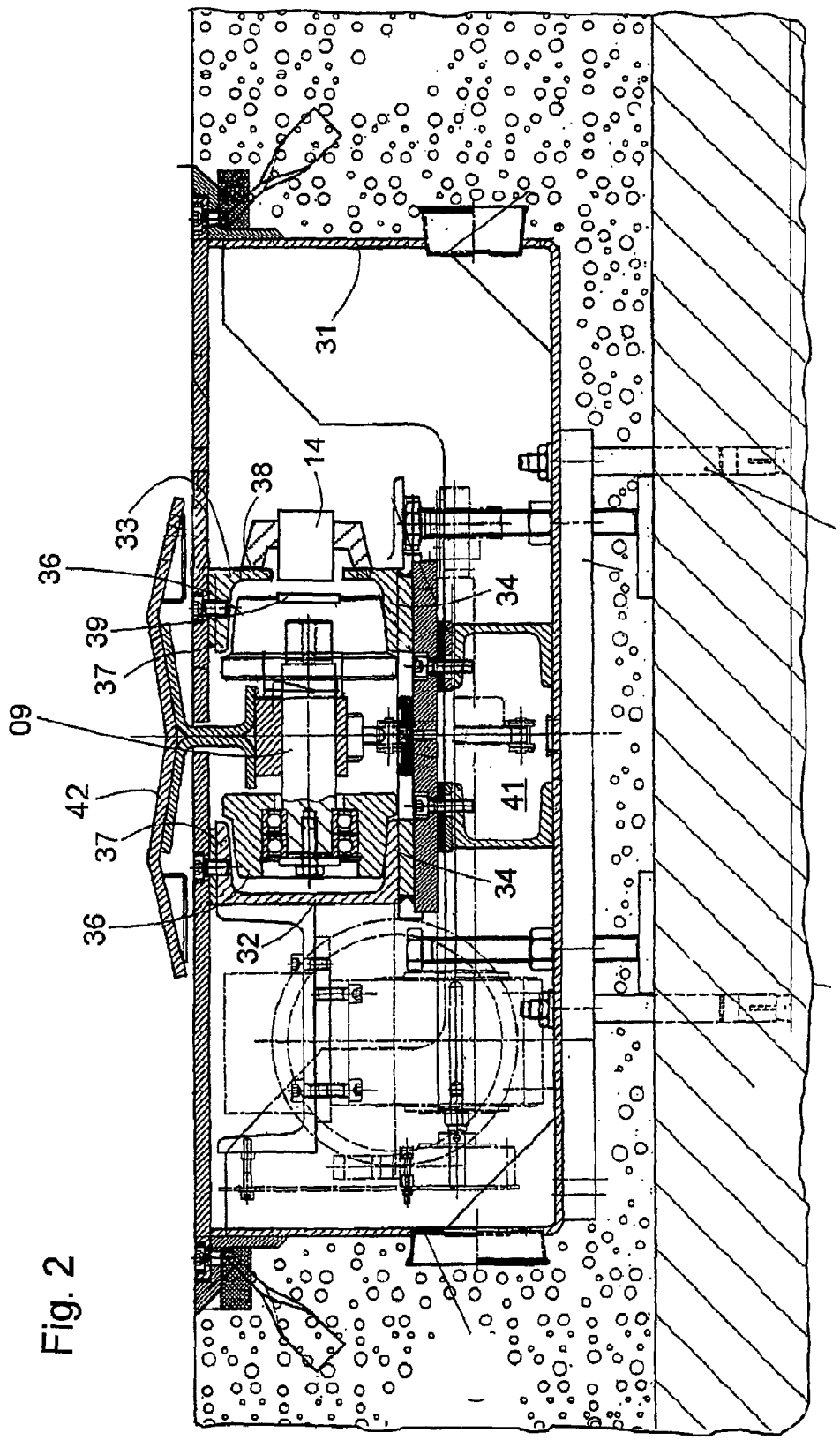

A track 08, on which transport carts 09 can be moved, extends along the storage facility 01. A loading station 11, 12 or 13 is assigned to each area or zone 03, 06, 07 and is located at the track 08 along the storage facility 01. Rolls 04 of material can be loaded on the transport carts 09 at each loading station 11, 12 or 13 with the aid of loading gear which is not specifically represented in FIG. 1. A read/write device 14 is located at each loading station 11, 12, 13, which device 14, that is depicted in FIG. 2, is used to write a set of data into a data support 39, also shown in FIG. 2, of a transport cart 09, which transport cart is being loaded at a selected one of the respective loading stations 11, 12, 13. A connection with, for example, automatic data reading options, by the use of a bar code reader, is also possible. Each one of these read/write devices 14 always writes the data set characteristic for the area or zone 03, 06 or 07 of the storage facility 01 assigned to it, or the data associated with the properties of the rolls 04 of material stored there, or of the automatically or manually recorded data sets of the bar code reader, into the data support 39 of a loaded transport cart 09. The data supports 39 each have a storage area, which can be overwritten, for storing this data set, as well as a read-only area, in which at least one unequivocal identification of the specific transport cart 09 is stored, and which is mounted on the data support 39.

In FIG. 1, the rolls 04 of material are represented lying prone in the storage facility 01. An upright storage of the rolls 04 is also possible. The gear then used for loading the rolls 04 of material on the transport carts 09 must be capable of bringing these rolls 04 into a horizontal position.

The rolls 04 of material loaded up at the storage facility 01 are transported by the transport carts 09 on which they are carried. They initially reach an unwrapping station 16, in which station 16 their wrapping is removed.

FIG. 1 shows the unwrapping station 16 as being located adjacent a single track 08. This arrangement makes it necessary to load an unwrapped roll 04 on the same transport cart 09 on the same track 08 on which the roll 04 of material had been delivered to the unwrapping station 16.

If the same transport cart 09 is used for loading the now unwrapped roll 04 of material, no data transfer is required.

Figure 3:
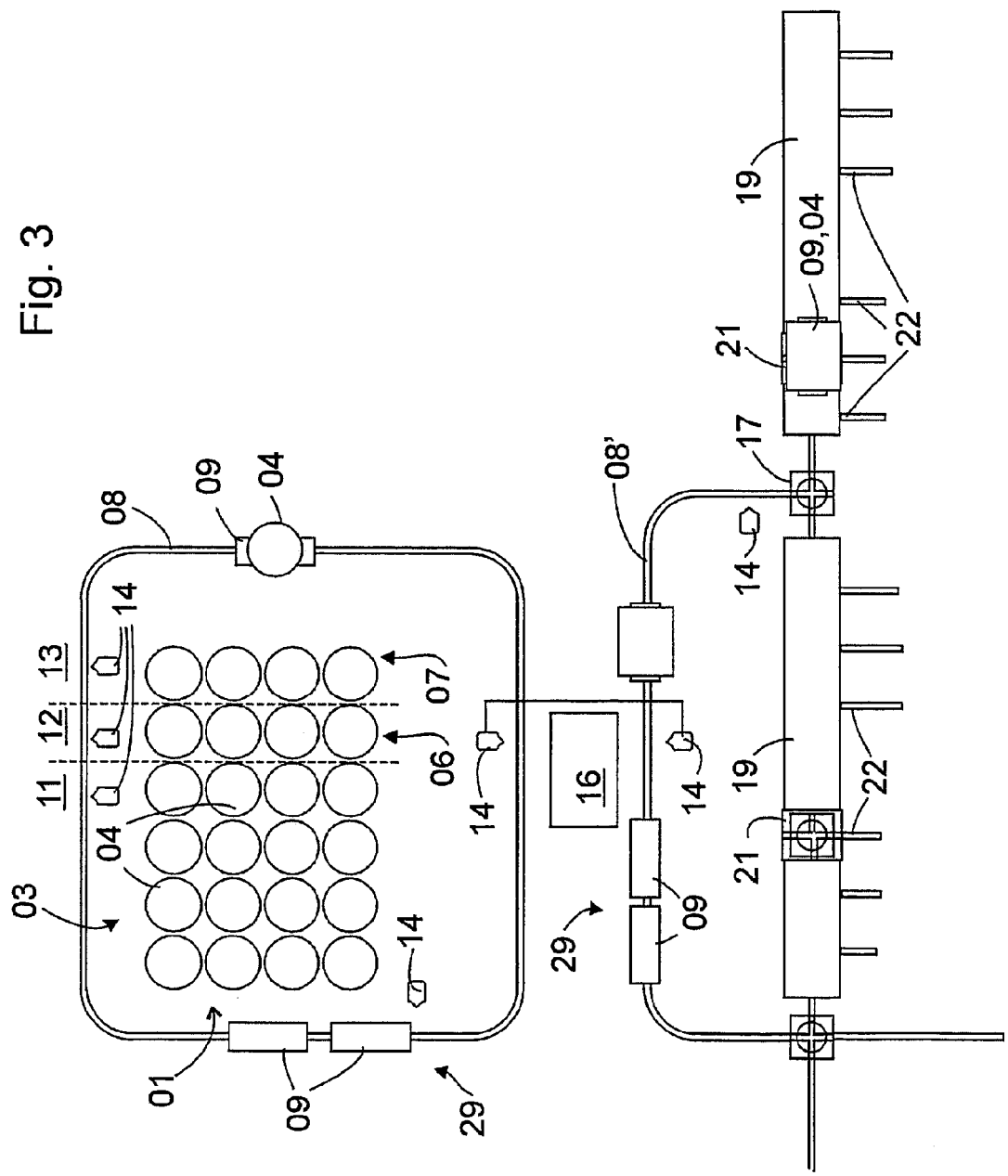

In the variation of the transport system in accordance with the present invention, as represented in FIG. 3, the unwrapping station 16 constitutes an interface between a delivery track 08, on which the rolls 04 of material are delivered, and a conveying track 08', on which they are then conveyed.

Two read/write devices 14 at the track 08 and at the track 08' are assigned to the unwrapping station 16 of this second preferred embodiment. The first of these devices 14 reads data regarding a roll 04 of material taken up in the unwrapping station 16 from the data support 39 of a first transport cart 09, which has brought the roll 04 of material and transfers this data to the second read/write device. The second read/write device 14 transfers this data to a data support 39 of a transport cart 09 which is waiting on the track 08' for the unwrapped roll 04 of material.

As represented in FIG. 3, with this second preferred embodiment, the rolls 04 of material can be stored upright in the storage facility 01. These rolls are only tipped over into a prone orientation at the unwrapping station 16.

The structure and mode of operation downstream of the unwrapping station are identical in both embodiments of the transport system in accordance with the present invention, unless otherwise indicated. They will be described in what follows by making reference to FIG. 1.

After passage of the transport cart or carts 09 through the unwrapping station 16, the transport cart 09 with the now unwrapped roll of material 04 passes by another read/write device 14 and arrives at a turntable 17. The transport cart 09 is rotated on this turntable 17 by 90°, either in a clockwise or in a counterclockwise direction, and is further moved over a short piece of track 18, of the same type as the track 08, to a first transport track 19, on which a first carrier cart 21 can be moved. To the right of the turntable 17, as depicted in FIG. 1, the carrier cart 21 is shown loaded with a transport cart 09 and with a web 04 of material carried on the transport cart 09. The carrier cart 21 is shown without a load on the transport track 19 to the left of the turntable 17. It can be seen that each carrier cart 21 also supports a cart turntable 17 which is analogous to the turntable 17.

Track pieces 22, which extend at right angles from the transport tracks 19 constitute an intermediate storage area or zone for transport carts 09. The transport carts 09 in this intermediate area or zone are loaded with rolls 04 of material that is intended for immediate use.

The track pieces 22 each terminate at a second transport track 23, on which a second carrier cart 24 can be moved, which second carrier cart 24 is capable of receiving a transport cart 09 together with its roll 04 of material. The second carrier cart 24 does not have a turntable 17. Instead, it has a read/write device 14 for reading the data values entered into the data support 39 of the transport cart 09. It is possible to decide, by the use of these documents, to which one of a plurality of roll changers 02, which are arranged alongside the second transport track 23, the second carrier cart 24 is to be moved for unloading its freight. Two parallel track pieces 26 and 27 are assigned to each roll changer 02, one track piece 26 of each pair 26, 27 is for transport carts 09 loaded with full rolls 04 of material. The second track piece 27 of each pair 26, 27 is designated for empty transport carts 09, on which empty carts 24, cores of rolls 04 of material used up in the roll changer 02, or cores of only partially used-up rolls 04 of material are loaded. Each one of the parallel roll changer track pieces 26, 27 is provided with a read/write device 14 for recording the data of freshly delivered rolls 04 of material, or for entering the data from used-up rolls 04 of material or from partially used-up rolls 24 of material, which are being moved away from the roll changer 02. Transport carts 09, which are loaded with an empty core at a roll changer 02, are moved back via the second transport track 23 and by a return track piece 28 to a waiting zone 29 of the track 08, where they wait for being loaded again at the storage facility 01. A read/write device 14 is situated at the entry to the waiting zone 29 and records the identification of the arriving transport carts 09 by reading their data supports 39.

In the second preferred embodiment of the present invention, in accordance with FIG. 3, two such waiting zones 29 can be provided, one on the delivery track 08 for transport carts 09 waiting to be loaded at the storage facility 01, and one on the conveying track 08' at the unwrapping station 16 for transport carts 09 waiting for an unwrapped roll 04 of material.

FIG. 2 shows a vertical cross-sectional view through the track 08, 18, 22, 26, 27 or 28 at the level of a read/write device 14. A transport cart 09 is depicted as running on the track.

The track 08, 18, 22, 26, 27, 28 is a part of an underfloor transport system with a housing 31 embedded in a surrounding floor. Two rails 32, 33, each having a C-shaped cross section, lie facing each other in the housing 31. A lower leg 34 of the C-shape rail constitutes a running surface for wheels 36 of the transport cart 09. An upper leg 37 of each C-shape rail extends symmetrically in respect to the lower leg 34, above the wheels 36. An opening, in which a read/write device 14 is mounted, is located at half the height of a lateral flank 38 of the left C-shape rail 32, which lateral flank 38 connects the legs 34, 37. The read/write device 14 is configured to radiate a radio signal in a direction toward the transport cart 09 and to receive a response signal from there.

A tractor chain, for use in driving the transport carts 09, extends in a conduit 41 below the tracks 32, 33. This chain receives downwardly projecting legs from the transport carts 09.

The running gear of the transport cart 09 lies within the housing 31. A support plate 42 portion of the transport cart 09, for supporting the webs 04 of material to be transported, lies outside of the housing 31 and above the floor level which surrounds it, as may be seen in FIG. 2.

The transport cart 09 has a cart data support 39 in the form of a transponder 39 on the hub of a wheel 36 facing the right track 33, or possibly alternatively positioned at another part of the transport cart 09, which transponder is capable of extracting coded data from a writing radio signal that is radiated by the read/write device 14 and to store this coded data, as well as to provide a response signal, which is coded with the stored data, upon receipt of a read radio signal, and to function as a data support which can be written upon. Such transmit/receive devices, or transponders 39, are generally well known and need not be described in detail here.

In the preferred embodiments of the present invention, which are described here, the read/write devices 14 and the cart data support devices or transponders 39 are each arranged on one side of the rail 32, 33, or on one side of the transport carts 09. This does not lead to any practical problems as long as the turning of the transport carts 09 on the turntable 17, or on or by the carrier cart 21 are performed uniformly. The transponders 39 are located on the same side of all of the transport carts 09 which are located on the same track piece 08, 18, 22, 26, 27.

It is, of course, also possible to arrange the read/write devices 14 and the transponders 39, each in pairs, on different sides of the tracks 08, 18, 22, 26, 27, or on different sides of the transport carts 09. It is only necessary that these pairs be able to communicate with each other.

While preferred embodiments of a goods transport system, and of a method for operating a goods transport system, in accordance with the present invention, have been set forth fully and completely hereinabove, it will be understood by one of skill in the art that various changes in, for example the drive assembly for the transport carts, the sizes of the paper rolls being conveyed and the like could be made without departing from the true spirit and scope of the present invention which is accordingly to be limited only by the appended claims.

What is claimed is:

1. A transport system for articles, comprising:
a network of tracks and including a plurality of tracks;
a plurality of transport carts, each one of said plurality of transport carts having running gear and being supported by positioning said running gear for movement on one of said tracks, each one of said plurality of transport carts also being adapted to support articles to be transported;
a data support on each one of said plurality of transport carts and located on said running gear at a level of said tracks; and
read/write devices, each of said read/write devices being adapted for the contactless reading and writing of data on each said data support, each of said read/write devices being arranged adjacent to said data support and at said level of said tracks.

2. The transport system of claim 1 wherein each one of said tracks has rails with a housing surrounding said rails.

3. The device of claim 2 wherein said read/write device is located in said housing.

4. The transport system of claim 2 wherein each of said rails has a cross-section formed as a mirror image about a horizontal center line, said rail including an upper leg and a lower leg, and further wherein said transport cart running gear includes wheels, said wheels being supported by said lower leg and spaced from said upper leg, and axles supporting said wheels on said transport cart, said read/write device being arranged intermediate said upper and lower legs, said data support being mounted at a height of said axle of said transport cart.

5. The transport system of claim 4 further including a wheel hub for each said transport cart wheel, said data support being mounted on said wheel hub.

6. The transport system of claim 1 further including a transport cart identification stored in said data support for each said transport cart.

7. The transport system of claim 1 wherein each said data support is a transponder.

8. The transport system of claim 1 further including a floor, said data support being located underneath said floor.

9. The transport system of claim 1 further including a roll changer of a web-processing machine and wherein said transport cart transports at least one roll of material to said roll changer.

10. The device of claim 1 wherein said data support is a transponder.

11. A transport system for articles comprising:
at least one transport cart supported for movement along a floor;
a support element on said at least one transport cart and arranged above the floor;
running gear on said at least one transport cart and located beneath the floor;
a data support on said at least one transport cart, said data support being located on said running gear; and
at least one read/write device for reading and writing data on said at least one data support, said at least one read/write device being positioned beneath the floor and adjacent said data support.

12. The transport system of claim 11 further including a roll changer of a web-processing machine and wherein said transport cart transports at least one roll of material to said roll changer.

13. The device of claim 11 further including rails located under the floor for supporting said at least one transport cart, a housing surrounding said rails.

14. The device of claim 13 wherein said read/write device is located in said housing.

15. The transport system of claim 13 wherein each of said rails has a cross-section formed as a mirror image about a horizontal center line, said rail including an upper leg and a lower leg, and further wherein said transport cart running gear includes wheels, said wheels being supported by said lower leg and spaced from said upper leg, and axles supporting said wheels on said transport cart, said read/write device being arranged intermediate said upper and lower legs, said data support being mounted at a height of said axle of said transport cart.

16. The transport system of claim 15 further including a wheel hub for each said transport cart wheel, said data support being mounted on said wheel hub.

17. The transport system of claim 11 further including a transport cart identification stored in said data support for said transport cart.

18. A method for operating a transport system for articles including:
providing a transport cart including running gear;
providing a Support track for said running gear of said transport cart;
locating said support track below a floor;
using said transport cart for supporting articles to be transported;
providing a data support on said running gear of said transport cart;
loading an article to be transported on said transport cart;
writing data regarding the article to be transported on said data support during said loading of the article on said transport cart using said at least one read/write assembly;
unloading said article to be transported from said transport cart; and
using said at least one read/write device and altering said data on said data support during unloading of the article to be transported from said transport cart.

19. The method of claim 18 further including providing a plurality of article loading stations adapted for loading articles on said transport cart, and writing said data on said data support at each said plurality of article loading stations.

20. The method of claim 18 further including providing a plurality of said transport carts and transferring said data from a first transport cart to a second transport cart during transfer of an article from said first transport cart to said second transport cart.

21. The method of claim 18 further including providing said data support on one of a roll of material and a wrapping of a roll of material.

* * * * *